United States Patent [19]

Stefancsik

[11] 4,143,036

[45] Mar. 6, 1979

[54] PROCESS FOR PREPARING METALIZED AZO PIGMENTS

[75] Inventor: Ernest A. Stefancsik, Flemington, N.J.

[73] Assignee: E. I. Du Pont de Nemours and Company, Wilmington, Del.

[21] Appl. No.: 764,234

[22] Filed: Jan. 31, 1977

[51] Int. Cl.$^2$ .................... C09B 29/10; C09B 63/00

[52] U.S. Cl. .................... 260/202; 260/208

[58] Field of Search .................... 260/202, 208

[56] References Cited

U.S. PATENT DOCUMENTS

| Re. 18,590 | 9/1932 | Allen et al. | 106/289 |
|---|---|---|---|
| 918,244 | 4/1909 | Wurthner | 260/195 |
| 983,486 | 2/1911 | Ernst et al. | 260/202 |
| 1,951,298 | 3/1934 | Wagner | 260/202 |
| 2,117,860 | 5/1938 | Siegel | 260/202 X |
| 2,694,055 | 11/1954 | Ludwig et al. | 260/202 X |
| 2,727,888 | 12/1955 | Hannum | 260/202 |
| 2,744,027 | 5/1956 | Struve et al. | 260/202 X |
| 2,821,525 | 1/1958 | Waitkins et al. | 260/202 X |
| 3,520,870 | 7/1970 | Dombroski | 260/195 |

*Primary Examiner*—Charles F. Warren

[57] ABSTRACT

Preparation of Aqueous-Stable Metalized Azo Pigment from 5-amino or 4-amino-2-chloro-toluene-5-sulfonic Acid and 3-hydroxy-2-naphthoic Acid with Calcium and Strontium Salts by diazotizing one of 2-chloro-5-amino-toluene-4-sulfonic acid and 2-chloro-4-amino-toluene-5-sulfonic acid, contacting the diazo with an inorganic salt of calcium, coupling the diazo with 3-hydroxy-2-naphthoic acid, and contacting the coupled diazo with an inorganic salt of strontium. The resulting metalized azo pigment exhibits high stability in aqueous coating compositions.

3 Claims, No Drawings

PROCESS FOR PREPARING METALIZED AZO PIGMENTS

BACKGROUND OF THE INVENTION

The invention is directed to metalized azo pigments, and particularly to process for preparing metalized azo pigment having superior color and viscosity stability in aqueous coating compositions.

Metalized azo pigments of the type prepared by coupling 3-hydroxy-2-naphthoic acid with the diazo of either 2-chloro-5-amino-toluene-4-sulfonic acid or 2-chloro-4-amino-toluene-5-sulfonic acid followed by precipitation with calcium, barium, strontium or manganese salts for a well-known class of colored pigments. The calcium azo pigment, which commonly contains strontium as a coprecipitant, is widely used in printing inks because of good bleed resistance, stable viscosity, high color intensity, and good dispersibility.

The earliest preparations of these metalized azo pigments is described in U.S. Pat. Nos. 1,803,657, 2,117,860, and 2,225,665. In all cases, the basic procedure for preparing metalized azo pigment involves the steps of diazotization and coupling, followed by precipitation with a metal salt. A variation of the basic procedure was later described in U.S. Pat. No. 2,744,027. This procedure involves mixing a predetermined amount of azo dye formed from diazotized 2-chloro-4-amino-toluene-5-sulfonic acid and 3-hydroxy-2-naphthoic acid with the azo dye from 2-chloro-4-amino-anisole-5-sulfonic acid and 3-hydroxy-2-naphthoic acid prior to precipitation with a metal salt.

The calcium azo pigments prepared by the above procedures are satisfactory for a wide variety of applications, but undergo an undesirable hue change from a blue shade red to a yellow shade when aged in aqueous ink systems. Historically this color drift has been a problem since the first significant commercial use of aqueous inks in the 1950's. However, little attention was paid to this problem at the time, because of the relatively low volume of aqueous ink used. In recent times growing concern over the environment has caused ink manufacturers and users to increasingly prefer aqueous inks to avoid the pollution problems associated with organic inks. Since calcium azo pigment is unsuitable in aqueous inks, the industry has turned to inferior substitutes which provide color stability, but lack the desirable lightfastness of the calcium azo pigment.

This invention provides an improved process for preparing calcium azo pigment whereby the resulting pigment retains the desired properties such as lightfastness and retains color and viscosity stability in aqueous compositions.

SUMMARY OF THE INVENTION

According to the invention there is provided an improved process for preparing metalized azo pigment of the general formula

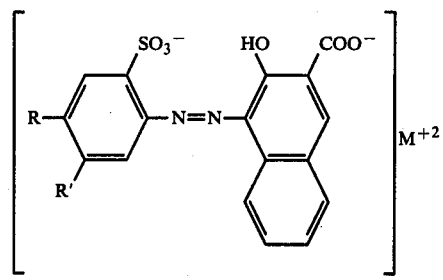

where R and R' are selected from $CH_3$ and Cl and only one of R and R' can be $CH_3$, and where M is selected from at least one of calcium and strontium by the steps of (i) diazotizing one of 2-chloro-5-amino-toluene-4-sulfonic acid and 2-chloro-4-amino-toluene-5-sulfonic acid, (ii) coupling the diazo of Step (i) with 3-hydroxy-2-naphthoic acid to form an azo, and (iii) forming the metalized azo pigment by contacting the azo formed in Step (ii) with an inorganic salt of at least one of calcium and strontium. The improvement resides in contacting the diazo of Step (i) with an inorganic salt of calcium prior to Step (ii) and contacting the azo formed in Step (ii) with an inorganic salt of strontium to form the metalized azo pigment. It is preferred that the inorganic salt of calcium be utilized in an amount sufficient to provide from 0.7 to 1.1 moles of calcium, calculated as calcium chloride, per mole of metalized azo pigment and that the inorganic salt of strontium be utilized in an amount sufficient to provide from 0.6 to 1.0 moles of strontium, calculated as strontium nitrate, per mole of metalized azo pigment.

DETAILED DESCRIPTION OF THE INVENTION

The inorganic salts of calcium and strontium utilized in accordance with the invention are selected from those conventionally used to precipitate the metalized azo pigment. The inorganic salts should be at least moderately soluble in water and should not interfere with the coupling of the diazo. Within the confines of moderate solubility, the choice of inorganic salt is determined primarily by economics. Consequently, calcium chloride and strontium nitrate are recommended.

Except for the point at which the calcium salt is added to the reaction sequence, the formation of the diazo and subsequent coupling are substantially the same as those long known in the art, e.g., U.S. Pat. No. 2,225,665 and U.S. Pat. No. 2,744,027. The conditions of coupling, such as temperature, concentration, pH and the like, although influencing the color to some extent, are not critical to the invention and can be varied within substantial limits as will be apparent to one skilled in the art.

The coprecipitation of a metallic rosinate with the metalized azo pigment, as shown below in Example 1, is a well-known operation in the preparation of azo pigments and is in accordance with the procedures disclosed in U.S. Reissue Pat. No. 18,590, which is also contemplated as useful herein. It frequently results in more intense colors and is often preferred for this reason. However, such treatment is not an essential part of this invention since the characteristic superior aqueous stability of the metalized azo pigment of the invention is obtained without recourse to such treatment.

Relative to metalized azo pigments prepared by the known methods involving salt addition after coupling, the metalized azo pigments of the invention exhibit superior color and viscosity stability in aqueous coating compositions, such as aqueous inks.

DESCRIPTION OF THE TESTS

The color and viscosity stability of the metalized azo pigments of the invention and Control pigments, prepared in the following examples, were determined in the following manner. Twenty-two grams of the pigment to be tested were ball milled with 270 g of steel shot in 147 g of a conventional aqueous flexographic ink vehicle at 11% pigment valume concentration and a 1:2 pigment-:binder ratio. The resulting aqueous flexographic ink composition was divided into two equal aliquots. One aliquot was stored at room temperature and the other was placed in a 140° F. (60° C.) oven for 24 hours. Both the aliquots were drawn down in juxtaposition on nitrocellulose coated aluminum foil. The color of the resulting draw down was noted and the consistency of the composition after aging as evidenced by viscosity.

The following Examples illustrate the invention.

EXAMPLE 1

Twenty-two and one-tenth grams of 2-chloro-4-amino-toluene-5-sulfonic acid was dissolved in about 600 g of warm water containing 4.2 g of sodium hydroxide. After cooling with ice to 0° C., 7 g of sodium nitrite dissolved in 25 g of cold water were added, followed by 10.6 g of 100% hydrochloric acid to form a suspension of diazo. Then 10 g of calcium chloride dissolved in 50 g of water were added to the diazo suspension.

In a separate container 20 g of 3-hydroxy-2-naphthoic acid were dissolved in 180 g of warm water by addition of 8 g of sodium hydroxide. Eight grams of sodium carbonate were added to the solution and the mixture was cooled to 15° C. The diazo suspension prepared above was then added to the mixture over a period of about 30 minutes. To the resulting azo suspension was added 10 g of sodium rosinate dissolved in hot water, followed by 14.6 g of strontium nitrate dissolved in 75 g of water. The mixture was then heated to boiling and boiled for ten minutes. The bright red metalized azo pigment was isolated by filtration, washed and dried.

The resulting metalized azo pigment was tested as described above and exhibited no change in color or thickening, i.e., increase in viscosity, upon oven aging in the aqueous ink composition.

Control

The procedure of Example 1 was followed except that the calcium chloride was added in an amount of 30 g after the formation of the azo and after the addition of the sodium rosinate solution and no strontium nitrate was utilized.

The resulting metalized azo pigment was tested as described above and exhibited a yellowing in hue and a significant thickening, i.e., increase in viscosity, upon oven aging.

EXAMPLE 2

The procedure of Example 1 was followed except that 2-chloro-5-amino-toluene-4-sulfonic acid was used in place of 2-chloro-4-amino-toluene-5-sulfonic acid.

The resulting metalized azo pigment was tested as described above and exhibited no change in color or thickening, i.e., increase in viscosity, upon oven aging.

Control

The procedure of Example 2 was followed except that the calcium chloride was added in an amount of 30 g after the formation of the azo and after the addition of the sodium rosinate solution and no strontium nitrate was utilized.

The resulting metalized azo pigment was tested as described above and exhibited a yellowing in hue and a significant thickening, i.e., increase in viscosity, upon oven aging.

What is claimed is:

1. In a process for preparing metalized azo pigment of the general formula

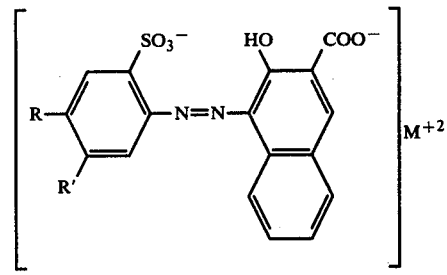

wherein R and R' are selected from $CH_3$ and Cl and one of R and R' must be $CH_3$, and where M is selected from at least one of calcium and strontium by the steps of (i) diazotizing one of 2-chloro-5-amino-toluene-4-sulfonic acid and 2-chloro-4-amino-toluene-5-sulfonic acid, (ii) coupling the diazo of Step (i) with 3-hydroxy-2-naphthoic acid to form an azo, and (iii) forming the metalized azo pigment by contacting azo formed in Step (ii) with an inorganic salt of at least one of calcium and strontium, the improvement comprising contacting the diazo of Step (i) with an inorganic salt of calcium prior to Step (ii) and contacting the azo formed in Step (ii) with an inorganic salt of strontium to form the metalized azo pigment.

2. Process according to claim 1 wherein the inorganic salt of calcium is utilized in an amount sufficient to provide from 0.7 to 1.1 moles of calcium, calculated as calcium chloride, per mole of metalized azo pigment.

3. Process according to claim 2 wherein the inorganic salt of strontium is utilized in an amount sufficient to provide from 0.6 to 1.0 moles of strontium, calculated as strontium nitrate, per mole of metalized azo pigment.

* * * * *